(12) United States Patent
Jung et al.

(10) Patent No.: US 8,611,413 B2
(45) Date of Patent: Dec. 17, 2013

(54) ADAPTIVE CODING AND DECODING

(75) Inventors: Joël Jung, Le Mesnil Saint Denis (FR);
Guillaume Laroche, Paris (FR); Marc Ballavoine, Buc (FR)

(73) Assignee: France Telecom, Paris (FR)

( * ) Notice: Subject to any disclaimer, the term of this patent is extended or adjusted under 35 U.S.C. 154(b) by 1120 days.

(21) Appl. No.: 12/087,577

(22) PCT Filed: Jan. 12, 2007

(86) PCT No.: PCT/IB2007/000812
§ 371 (c)(1),
(2), (4) Date: Jul. 10, 2008

(87) PCT Pub. No.: WO2007/080520
PCT Pub. Date: Jul. 19, 2007

(65) Prior Publication Data
US 2009/0129464 A1    May 21, 2009

(30) Foreign Application Priority Data
Jan. 12, 2006 (FR) .................................. 06 00273

(51) Int. Cl.
*H04N 7/26* (2006.01)
*H04N 7/12* (2006.01)

(52) U.S. Cl.
USPC .................................... 375/240; 375/E7.126

(58) Field of Classification Search
USPC ........................................ 375/240.01–240.29
IPC ........................................................ H04N 7/12
See application file for complete search history.

(56) References Cited

U.S. PATENT DOCUMENTS

| | | | |
|---|---|---|---|
| 6,498,810 B1 | 12/2002 | Kim et al. | |
| 6,983,018 B1 | 1/2006 | Lin et al. | |
| 7,782,941 B2 * | 8/2010 | Suzuki et al. | 375/240.12 |
| 2002/0021752 A1 * | 2/2002 | Hannuksela | 375/240.01 |
| 2003/0026940 A1 * | 2/2003 | Bullock | 428/99 |
| 2004/0091048 A1 * | 5/2004 | Youn | 375/240.16 |
| 2004/0264573 A1 * | 12/2004 | Bossen | 375/240.16 |
| 2005/0013498 A1 * | 1/2005 | Srinivasan et al. | 382/239 |
| 2005/0243925 A1 * | 11/2005 | Bottreau | 375/240.16 |

OTHER PUBLICATIONS

Kim et al, "An Efficient Motion Vector Coding Scheme Based on Minimum Bitrate Prediction", IEEE Trans. on Image Processing, vol. 8, No. 8, Aug. 1999, pp. 1117-1120.*

(Continued)

*Primary Examiner* — Jay Patel
*Assistant Examiner* — Reza Aghevli
(74) *Attorney, Agent, or Firm* — Knobbe Martens Olson & Bear LLP

(57) ABSTRACT

A method of transmitting an image portion, in a coding phase, comprises:
  analyzing a coding context;
  adapting a parameter of a group of prediction functions that can be used for coding;
  forming a first predicted descriptor using a selected prediction function; and
  determining and transmitting a residue ($\epsilon$) between the first predicted descriptor and the current descriptor. The method further includes a decoding phase comprising:
  analyzing a decoding context;
  adapting a parameter of a group of prediction functions that can be used for decoding;
  forming a second predicted descriptor (P*) using a selected prediction function; and
  combining the second predicted descriptor and the received residue to deliver a decoded version of the current descriptor (V*).

20 Claims, 2 Drawing Sheets

(56) References Cited

OTHER PUBLICATIONS

Sung Deuk Kim et al.: "An Efficient Motion Vector Coding Scheme Based on Minimum Bitrate Prediction"; IEEE Transactions on Image Processing, IEEE Service Center, Piscataway, NJ, US,; vol. 8, No. 8, (Aug. 1999), XP0111026355; ISSN: 1057-7149.

Wenqing Jiang et al.: "Forward/backward adaptative context selection with applications to motion vector filed encoding"; Image Processing, 1997. Proceedings., International Conference on Santa Barbara, Ca., USA Oct. 26-29, 1997, Los Alamito, Ca., USA, IEEE Comput. Soc., US, Oct. 26, 1997, pp. 168-171, XP010254049; ISBN: 0-8186-8183-7.

* cited by examiner

ADAPTIVE CODING AND DECODING

This application claims priority from the international application PCT/IB2007/000812 filed on Jan. 12, 2007 and of the French application 06 00273 filed on Jan. 12, 2006, which are hereby incorporated by reference in their entirety.

The present invention relates to image coding techniques.

BACKGROUND OF THE INVENTION

Many image coders support Interframe coding in which movement between the images of a sequence is estimated in order for the most recent image to be coded relative to one or more preceding images.

Each image of the sequence can also be coded without reference to the others. This is known as Intraframe coding and exploits spatial correlations in an image. For a given transmission bit rate from the coder to the decoder, it achieves lower video quality than Interframe coding because it does not make use of temporal correlation between images of the sequence.

A sequence commonly has its first image Intraframe-coded and subsequent images Interframe-coded. Information included in the output stream from the coder indicates the Intraframe-coded and Interframe-coded images and, when Interframe-coded, which reference image(s) to use.

A number of existing coding methods code a current image portion by determining representative information known as descriptors that consist of information relating to the pixels, for example, such as the luminance and the chrominance, or movement vectors for coding mode-choice information.

Some of those descriptors, in particular the movement vectors, can be predicted. It is then possible to analyze image portions to obtain predicted descriptors that are thereafter compared with current descriptors to extract a residue representing the difference between the predicted and current descriptors. Only this residue needs to be transmitted to a decoder.

The corresponding decoding methods are adapted to determine the predicted descriptors, such as the predicted movement vectors, locally and combine them with the residue received from the coder to obtain the current descriptors and therefore the current image portion.

Thus in such coding the stream between the coder and the decoder contains only the residue, and where applicable the reference of the image portions to use.

However, the prediction function that is used is sometimes not the optimum function. Employing groups of prediction functions that can be used in the coder and the decoder can overcome this problem. Each of the functions is tested in the coder before the coder selects one of them, generally the function producing the minimum residue.

In particular, among the descriptors, the movement vectors require a high bandwidth, in particular because of their accuracy, and are thus liable to be transmitted using a residue.

It is therefore necessary to include in the coder output stream an identifier of the prediction function used to enable the decoder to apply the correct prediction function.

The bandwidth allocated to the identifier of the prediction function is not negligible and increases with the size of the group from which the function is obtained.

This problem is addressed in IEEE *Transactions on Image Processing*, Vol. 8, no. 8, August 1999, by Sung Deuk Kim and Jong Beom Ra, who propose a particular coding system for the identifier of the prediction function used for the movement vectors.

Thus an increase in the size of the group of usable prediction functions improves prediction quality, but requires the allocation of a greater bandwidth for the identifier.

SUMMARY OF THE INVENTION

An object of the present invention is to solve this problem by proposing a coding method and a corresponding decoding method producing an optimum prediction by limiting bandwidth reduction.

To this end, the present invention consists in a method of coding images, the coding of a current image portion comprises the following steps:
  determining a current descriptor of the current image portion;
  selecting a prediction function in a tunable group of usable functions;
  forming a predicted descriptor of the current image portion from at least one other image portion and the selected prediction function;
  determining a residue representing a difference between the predicted descriptor and the current descriptor; and
  integrating the residue into an output stream intended for a decoder;
  the method being characterized in that it further comprises:
  analyzing a coding context; and
  adapting at least one parameter of the usable function group as a function of the analysis of the coding context.

The invention also consists in a method of decoding images, the decoding of a current image portion comprising the following steps:
  receiving a data stream comprising a residue;
  selecting a prediction function in a tunable group of usable prediction functions;
  forming a predicted descriptor of the current image portion from at least one other image portion and the selected prediction function; and
  combining the predicted descriptor and the residue to deliver a current descriptor of the current image portion;
  the method being characterized in that it further comprises:
  analyzing the decoding context; and
  adapting at least one parameter of the group of usable functions as a function of the analysis of the decoding context.

These coding and decoding methods form a method of transmitting information concerning an image portion.

Thus the adaptations of the groups of usable prediction functions are not transmitted but are determined independently in the coder and the decoder. Consequently, it is possible to optimize the group of usable prediction functions without impacting on the bandwidth.

According to other features of the invention, forming a predicted descriptor includes applying a prediction function that has parameters that can be adapted, adaptation includes modifying at least one of the parameters of the prediction function, and some of the adapted parameters are not transmitted between the coder and the decoder.

Thus to optimize a prediction function without reducing the bandwidth available for the data, it is possible to apply the principle of the invention to the parameters of a function that has parameters that can be adapted.

If the group of usable functions includes distinct elements, the invention includes, in the coder, expressing an identifier of the selected prediction function relative to the group of usable functions with parameters that have been adapted and integrating that identifier into an output stream. Symmetrically, this identifier is received by and used in the decoder.

In this implementation, the bandwidth necessary to transmit the identifier is reduced because the identifier is expressed relative to a group of usable functions whose parameters are adapted to the context.

In one particular implementation, selection comprises testing each of the functions of the group of usable functions and selecting a particular function in relation to those tests so that the prediction functions can compete with each other.

The present invention further consists in programs executing the methods described above and corresponding coders and decoders.

BRIEF DESCRIPTION OF THE DRAWINGS

Other features and advantages of the present invention become apparent in the course of the description given below by way of non-limiting example and with reference to the appended drawings, in which.

DESCRIPTION OF PREFERRED EMBODIMENTS

Figure 1:
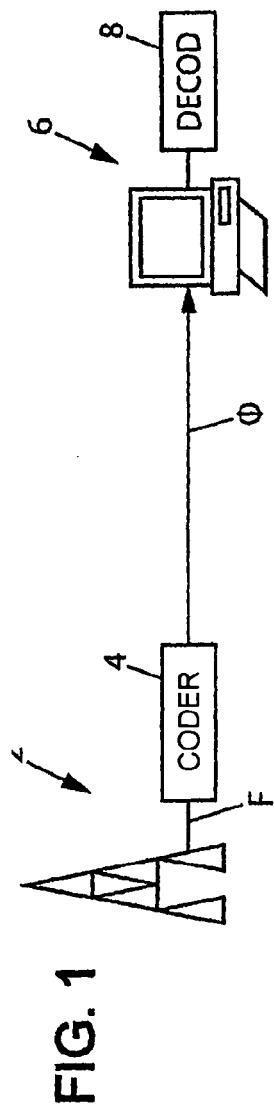
FIG. 1 is a diagram showing two communicating stations provided with video coders-decoders.

The invention can be applied to any type of image coding, for example to coding a video sequence of a digital television stream between a transmitter 2 containing a video coder 4 and a receiver 6 containing a decoder 8. For example, the transmitter 2 includes an antenna transmitting on a digital television radio channel in a format such as the DVB format and the station 6 is a personal computer.

Figure 2:
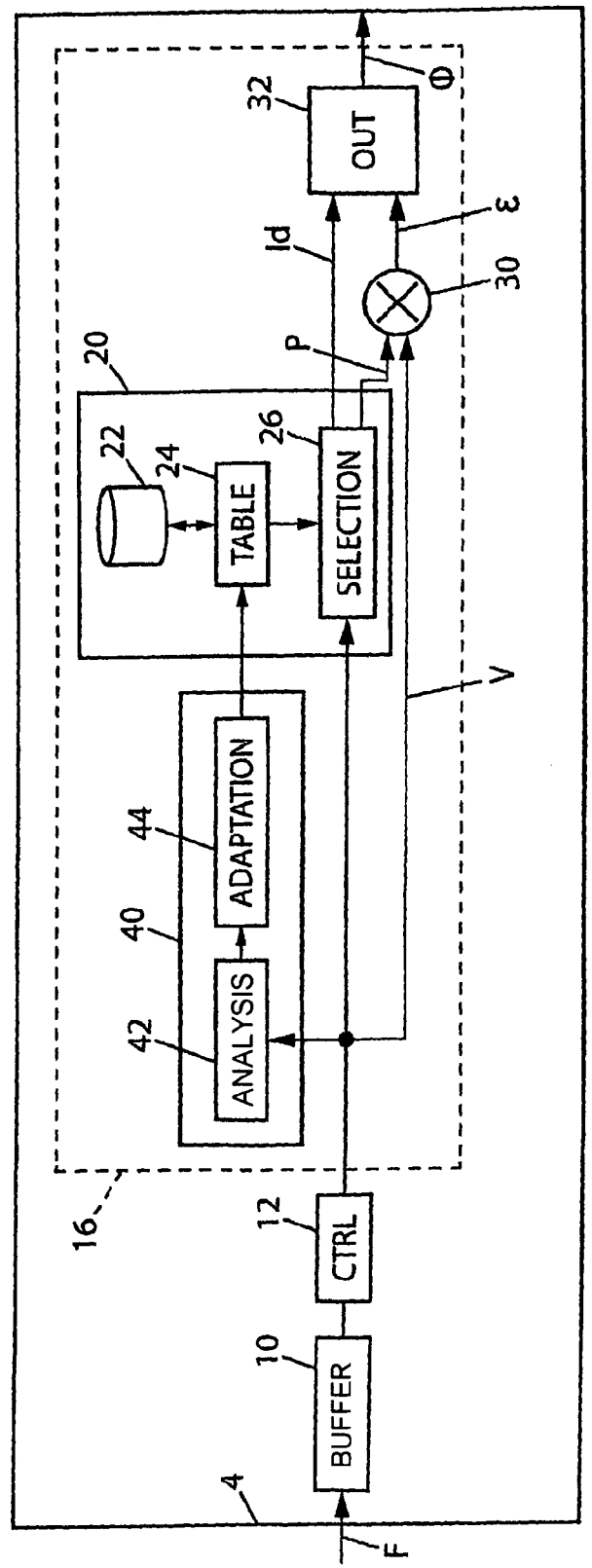
FIG. 2 is a block diagram of part of a video coder of the invention.

Referring to FIG. 2, a portion of the coder 4 that receives as input a stream F of images of a video sequence to be transmitted is described in detail below. The term "image" refers generally to an element of the video sequence. Depending on the standard, it can be interchangeably replaced by the term "frame".

In the coder 4, the stream F is first stored in a buffer 10 and a control unit 12 determines descriptors, for each current image portion from the buffer including pixel information, i.e. luminance and chrominance, a movement vector, and a coding mode such as the Interframe mode or the Intraframe mode.

There is described below only the processing of a movement vector V which is Interframe-coded, i.e. coded relative to portions of images in the video sequence preceding the current image. The invention can nevertheless be applied to other types of descriptors and in particular to the descriptor of the coding mode.

The control unit 12 is connected to a coding subsystem 16 that includes means 20 for predicting a predicted movement vector for the current image portion from one or more preceding image portions and coding prediction parameters. To be more precise, the predicted movement vector for the current image portion is obtained by applying a prediction function to one or more movement vectors of other image portions. Those movement vectors are the result of analyzing those other image portions.

The means 20 include a database 22 of movement vector prediction functions, some of which are extracted from the database 22 to form a usable prediction functions table 24.

| TYPE | REFERENCE | DETAILS |
|---|---|---|
| Space functions | 0 | Coding relative to the fixed value 0 |
| | GMs | Coding relative to the overall movement evaluated spatially in the images already coded |
| | Value | Coding relative to the value over this fragment |
| | Median value | Coding relative to the median value |
| | Mean value | Relative to the mean value |
| Time functions | Median value | Coding relative to the median time value |
| | Collocated | Coding relative to the collocated vector |
| | Mean value | Coding relative to the mean time value |
| | GMt | Coding relative to the overall movement evaluated temporally |
| Space-time functions | Median value | Coding relative to a median space-time value |
| Other | Inter component | Prediction between the two components x and y |

In the embodiment described, this table 24 has parameters that can be adapted, and its size and content can in particular be varied, as described in detail below, and so the coding prediction parameters are parameters of the table 24.

The table 24 is connected to a selector unit 26 that tests each of the usable prediction functions from the table 24 for coding the current image portion movement vector. To be more precise, the unit 26 applies each of the prediction functions in turn to one or more image portions preceding the current portion in the video sequence, i.e. to one or more movement vectors resulting from the analysis of those preceding image portions.

As a function of these tests, a particular prediction function is retained to form a predicted descriptor, i.e. a predicted movement vector P. This selection is effected through competition between the prediction functions in order to select, for example, the function producing the smallest possible residue. The selected prediction function is identified by an identifier Id relative to the table 24 and in the example described corresponding to the number of the function in the table.

The predicted movement vector P is transmitted to a combiner unit 30 which also receives the current vector V and determines a residue ε representing a difference between the predicted descriptor P and the current descriptor V.

The coder 4 also includes a unit 32 for generating an output data stream Φ and receiving as input the residue ε and other standard information elements, for example the identifiers of the image portions to which the prediction function must be applied.

In the example described, the selection unit 26 also transmits to the unit 32 the identifier Id of the prediction function used. The size of that identifier is directly dependent on the size of the table 24 and the bandwidth reserved for this identifier Id in the output stream Φ therefore varies as a function of the size of the table 24.

Moreover, the coding subsystem 16 also includes means 40 for adapting prediction parameters as a function of the coding context and which for this purpose include a unit 42 for analyzing the coding context.

The expression "analyzing the coding context" means analyzing various indicators defining the general framework in which coding is effected. These indicators include:
- statistical indicators linked to the prediction step, such as percentage usages of the prediction functions or differences that have been found between prediction functions;
- indicators describing variations in the images, such as directional gradients between images, the overall movement of an area, the activity, the quantity of Intraframe-coded, Interframe-coded or unchanged images or image fragments; and
- indicators describing the transmission conditions, such as bandwidth allocated as a function of transmission conditions or image resolution choices.

The unit 44 adapts some prediction parameters as a function of this coding context analysis. To be more specific, this unit 44 adapts the parameters of the usable prediction function table 24 by adding functions to or removing functions from the table.

In the example described, predetermined rules govern the adaptation of the table 24. Examples of such rules follow.

According to a first rule, in a situation in which the local characteristics of the image indicate that the overall movement is regular over the area to be coded and that the area to be coded contains sharp discontinuities, priority is assigned to time prediction functions. The overall movement is calculated by studying the values of the movement vectors previously selected for coding images or image portions. The discontinuities are calculated by summing the absolute values after contour detection filtering. Time functions are favored either by adding time functions to the table 24 of usable prediction functions or by eliminating space functions or other type of functions.

In another situation, if the sequence of images is determined to be static, i.e. if the number of movement vectors equal to 0 is above a particular threshold and the number of images or image portions unchanged is high, or if the usage statistics for the temporal prediction functions are low, the adaptation favors space prediction functions in the table 24, to the detriment of time functions.

Moreover, if two prediction functions from the usable function table 24 are close in terms of distance, i.e. if the sum of the difference between the predictions obtained by each of these functions is small, their common presence is no longer necessary and one of the prediction functions is eliminated.

If it is found that a prediction function is very rarely chosen, it can likewise be eliminated.

According to another rule, if a change of sequence is predicted between successive images, the usable prediction function table 24 is reinitialized.

Finally, according to a further rule, the size of the table is determined in part as a function of the bandwidth available for transmission, a larger size being authorized if a large fraction of the pass-band is available. Similarly, upper or lower limits on the size of the table can be set as a function of the required image quality and/or the available bandwidth.

Thus the size and content parameters of the table 24 are adapted to the coding context to retain only the most pertinent prediction functions whilst keeping the table 24, and therefore the identifier Id, as small as possible.

Some of the adapted prediction parameters are not integrated into the output stream Φ. To be more precise, in the example described, none of the adaptations of the table 24 are described or referred to in the output stream.

These adaptations result from the analysis of the coding context and, as such can be reproduced autonomously in the coder and the decoder, i.e. without it being necessary to transmit them.

It is thus possible to obtain improved coding of the descriptors of the current image portion, and in particular of the movement vectors, using an adapted prediction function and without impacting on the bandwidth allocated to transmission of the identifier Id of the prediction function used. This is a result of limiting the size of this identifier by controlling the parameters of the table 24.

Figure 3:
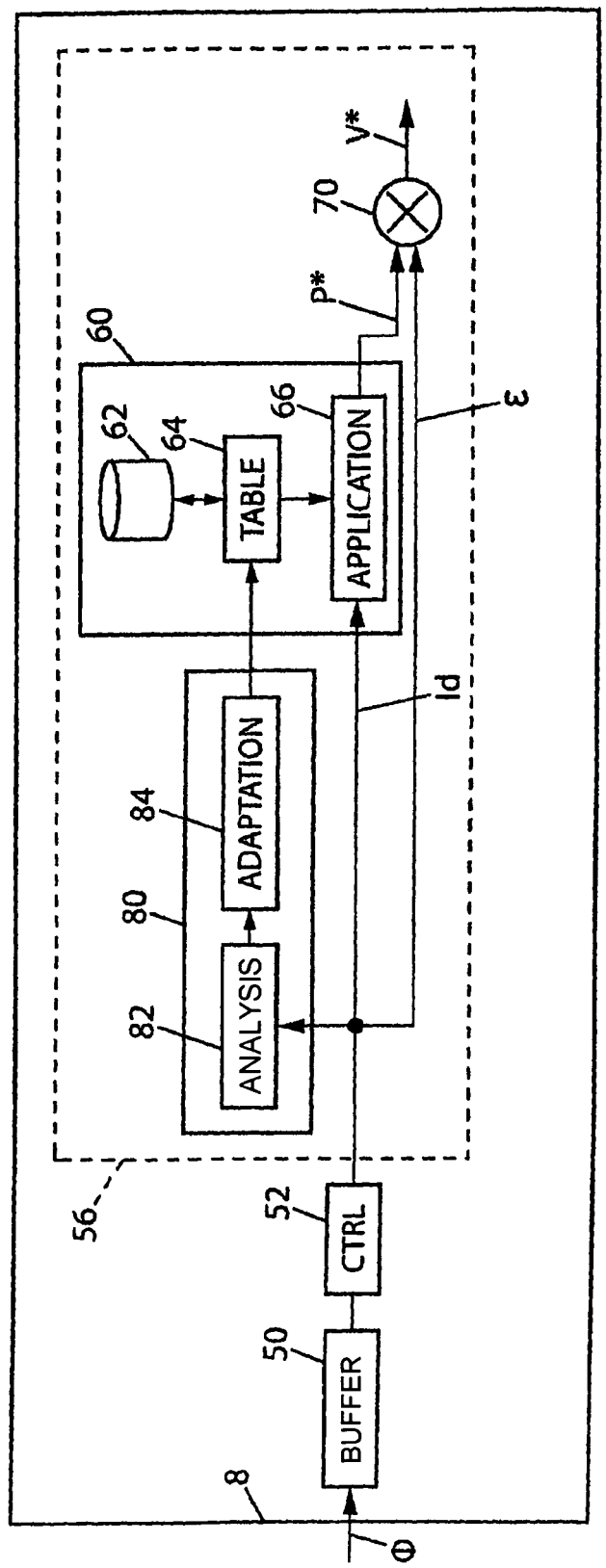
FIG. 3 is a block diagram of part of a video decoder of the invention, able to restore images coded by the FIG. 2 coder.

A portion of the decoder 8 that receives the stream Φ sent by the coder 4 is described in detail below with reference to FIG. 3.

This decoder 8 includes a buffer 50 which receives the stream Φ and a control unit 52 which analyses the data of the stream and in particular coding type information.

The output of the control unit 52 is sent to a decoder subsystem 56. In the same way as for the coder subsystem, the decoder subsystem 56 is described only with reference to a particular descriptor, which is an Interframe-coded movement vector.

The decoding subsystem 56 includes means 60 for predicting descriptors of the current image portion that produce a predicted movement vector P* for decoding from other image portions and prediction parameters. As in the coder subsystem, the means 60 can apply a prediction function to one or more movement vectors resulting from the analysis of other image portions.

The means 60 include a prediction function database 62 that contains the same prediction functions as the database 22 of the coder 4. The means 60 also include a table 64 of usable prediction functions and a function application unit 66. This unit 66 extracts a particular function to be used from the table 64 and extracts from the buffer 50 the image portion(s) to which the prediction function must be applied to deliver the predicted movement vector P*.

In the embodiment described, the parameters of the table 64 that can be adapted include its size and its content, and so the prediction parameters are parameters of the table 64.

The decoding system 56 also includes a combiner unit 70 receiving as input the predicted movement vector P* and the residue ε received in the stream Φ and delivering as output a current movement vector V* corresponding to the decoded version of the vector V. This vector V* must be applied to obtain the decoded version of the current image portion.

The decoding subsystem 56 further includes means 80 that adapt prediction parameters as a function of the decoding context and function autonomously, i.e. without instructions from the coder.

To be more precise, the means 80 include a unit 82 for analyzing the decoding context, similar to the unit 42 described above, and a unit 84 for adapting some prediction parameters for decoding, similar to the unit 44.

The adaptation unit 82 modifies the usable prediction function table 64 autonomously, subject to the same rules and criteria as the adaptations effected by the unit 42 in the coder 4. Consequently, these adaptations are identical, and so the usable prediction function tables 64 and 24 are modified in the same way in the coder and in the decoder, respectively, without it being necessary to transmit information describing the adaptations.

The identifier Id of the prediction function, corresponding to the number of the function used in the table 24 or 64, is sufficient for the decoder to select and apply the same prediction function as the coder. This function is the optimum prediction function of all the usable prediction functions because of the adaptations made to the tables 24 and 64.

These coders and decoders therefore implement specific coding and decoding methods, respectively.

Thus to code a current image portion, coding first determines the current movement vector V and analyzes the coding context, which leads to adaptation of parameters of the table 24. In this example, this optimization includes adaptation of the functions present in the table 24 as a function of the coding context in order to retain only the functions that are most pertinent.

The selection unit 26 then tests each of the usable functions in order finally to apply a particular prediction function delivering the predicted movement vector P. This function is referenced by its number in the table 24, denoted Id.

The predicted vector P and the current vector V are combined by the unit 30 to obtain the residue $\epsilon$ that is integrated into the output stream $\Phi$ with the identifier Id. There is no information describing the adaptations effected in the table 24 in the output stream.

In a corresponding way, decoding the current image portion includes receiving the stream $\Phi$, followed by analyzing the decoding context and adapting parameters of the table 64. As for coding, this adaptation includes adapting functions present in the table 64. Once that table 64 has been adapted, the identifier Id is used to select a particular prediction function in the table and to apply it to obtain the predicted movement vector P*.

That vector P* is then combined by the unit 70 with the residue $\epsilon$ received to obtain the current movement vector V* that will yield the decoded version of the current image portion.

The combination of coding and decoding methods forms an image transmission method comprising autonomous coding and decoding context analysis in the coder and the decoder, respectively, and prediction parameter adaptation.

Of course, other embodiments of the invention can be envisaged.

In one embodiment, the prediction means used in the coding and decoding subsystems include one or more prediction functions with parameters that can be adapted. For example, a time prediction function, such as a median value function, can be applied to larger or smaller reference areas, the size of the area forming a prediction parameter. In the same way, a time prediction function can use a multiplication parameter determined as a function of the movement found in the images. The parameters of that or those functions then form prediction parameters.

Using and adapting such parameters optimizes the prediction function and in particular reduces the residue $\epsilon$ to be transmitted.

As previously, these parameters are modified autonomously in the coder and the decoder and so it is not necessary to transmit information describing certain adaptations of the parameters of the prediction functions between the coder and the decoder.

Of course, if only one prediction function can be used, for example if there is no provision for competition between the prediction functions and a single function with parameters that can be adapted is used, it is not necessary to transmit an identifier of the function between the coder and the decoder. The data stream then includes only the residue and the reference of the preceding image(s) to be used.

In a further embodiment, the image portions are Intraframe-coded, i.e. coded relative to each other within the same image. Under such circumstances, in order to obtain the current image portion, it is equally possible to use predictable descriptors, for example a movement vector applied to an already decoded portion of the image.

Implementation of the invention the coder and the decoder can be based on programs that have the features described above. Of course, it is equally possible to use dedicated processors or dedicated circuits.

The invention claimed is:

1. A method of coding images, the coding of a current image portion comprising the following steps:
   determining a current descriptor of the current image portion;
   selecting a prediction function in a tunable group of usable functions;
   forming a predicted descriptor of the current image portion from at least one other image portion and the selected prediction function;
   determining a residue representing a difference between the predicted descriptor and the current descriptor; and
   integrating the residue into an output stream intended for a decoder;
   wherein said group of tunable functions comprises at least one prediction function of a temporal type, and the method further comprises:
   analyzing a coding context according to at least image features; and
   adapting at least said prediction function of a temporal type on the basis of the analysis of said coding context, such that said output stream is free from information related to said adaptation.

2. The method according to claim 1, wherein forming a predicted descriptor includes applying a prediction function that has parameters that can be adapted, adaptation includes modifying at least one of the parameters of the prediction function, and some of the adapted parameters are not included in an output stream intended for the decoder.

3. The method according to claim 1 wherein, if the group of usable functions includes distinct elements, the method further includes expressing an identifier of the selected prediction function relative to the group of usable functions with parameters that have been adapted and integrating that identifier into an output stream.

4. The method according to claim 1 wherein said selecting comprises testing each of the functions of the group of usable functions and selecting a particular function in relation to those tests.

5. An image coder comprising:
   means for determining a current descriptor for a current image portion;
   means for selecting a prediction function in a tunable group of usable functions;
   prediction means for forming a predicted descriptor of the current image portion from at least one other image portion and the selected prediction function;
   means for determining a residue representing a difference between the predicted descriptor and the current descriptor; and
   means for integrating that residue into an output stream intended for a decoder;
   wherein said group of tunable functions comprises at least one prediction function of a temporal type, and the coder further comprises:
   means for analyzing the coding context according to at least image features;
   means for adapting at least said prediction function of a temporal type on the basis of the analysis of said coding context, such that said output stream is free from information related to said adaptation.

6. The coder according to claim 5, wherein said prediction means comprise a unit for applying a prediction function with parameters that can be adapted and the adaptation means adapt at least one parameter of the prediction function, some of the adapted parameters not being integrated into an output stream intended for the decoder.

7. The coder according to claim 5, further including means for expressing an identifier of the selected prediction function in relation to the group of usable functions with parameters that have been adapted and means for integrating that identifier into an output stream intended for the decoder.

8. A method of decoding images, the decoding of a current image portion comprising the following steps:
receiving a data stream comprising a residue;
selecting a prediction function in a tunable group of usable prediction functions;
forming a predicted descriptor of the current image portion from at least one other image portion and the selected prediction function; and
combining the predicted descriptor and the residue to deliver a current descriptor of the current image portion;
wherein said group of tunable functions comprises at least one prediction function of a temporal type, and the method further comprises:
analyzing the decoding context according to at least image features; and
adapting at least said prediction function of a temporal type on the basis of the analysis of said coding context, such that said output stream is free from information related to said adaptation.

9. The method according to claim 8, wherein forming the predicted descriptor comprises applying a tunable prediction function and adapting comprises adapting at least one parameter of the prediction function.

10. The method according to claim 8, further comprising receiving an identifier of the prediction function to be used in relation to the group of usable functions with parameters that have been adapted.

11. An image decoder comprising:
means for receiving a data stream containing a residue;
means for selecting a prediction function in a tunable group of usable prediction functions;
prediction means adapted to form a predicted descriptor of a current image portion from at least one other image portion and the selected prediction function; and
means for combining the predicted descriptor and the residue to deliver a current descriptor of the current image portion;
wherein said group of tunable functions comprises at least one prediction function of a temporal type, and the decoder further comprises:
means for analyzing the decoding context according to at least image features; and
means for adapting at least said prediction function of a temporal type on the basis of the analysis of said coding context, such that said output stream is free from information related to said adaptation.

12. The decoder according to claim 11, wherein the prediction means comprise a unit for applying at least one tunable prediction function and said adaptation means adapt at least one parameter of the prediction function.

13. A method of transmitting images, comprising, for a current image portion, a coding phase comprising the following steps:
determining a current descriptor of the current image portion;
analyzing a coding context;
adapting, in a group of tunable functions comprising at least one prediction function of a temporal type, said prediction function of a temporal type on the basis of the analysis of the coding context;
selecting a prediction function in the group of prediction functions that can be used for coding;
forming a first predicted descriptor of the current image portion from at least one other image portion and the prediction function selected for coding;
determining a residue representing the difference between the first predicted descriptor and the current descriptor; and
integrating the residue into a data stream;
the method further including, for said current image portion, a decoding phase comprising the following steps:
receiving the data stream comprising the residue;
analyzing the decoding context according to at least image features;
adapting, in a group of tunable functions comprising at least one prediction function of a temporal type, said prediction function of a temporal type on the basis of the analysis of the decoding context;
selecting a prediction function in the group of prediction functions that can be used for decoding;
forming a second predicted descriptor of the current image portion from at least one other image portion and the prediction function selected for decoding; and
combining the second predicted descriptor and the received residue to deliver a decoded version of the current descriptor.

14. A non-transitory computer readable medium adapted to be installed in a video processor device, comprising instructions for executing the steps of a video coding method according to claim 1 upon execution of the instructions by a calculation unit of said device.

15. A non-transitory computer readable medium adapted to be installed in a video processor device, comprising instructions for executing the steps of a decoding method according to claim 8 upon execution of the instructions by a calculation unit of said device.

16. An image coder comprising:
a component configured to determine a current descriptor for a current image portion;
a component configured to select a prediction function in a tunable group of usable functions;
a component configured to form a predicted descriptor of the current image portion from at least one other image portion and the selected prediction function;
a component configured to determine a residue representing a difference between the predicted descriptor and the current descriptor; and
a component configured to integrate that residue into an output stream intended for a decoder;
wherein said group of tunable functions comprises at least one prediction function of a temporal type, and the coder further comprises:
a component configured to analyze the coding context according to at least image features;
a component configured to adapt, at least said prediction function of a temporal type on the basis of the analysis of said coding context, such that said output stream is free from information related to said adaptation.

17. The coder according to claim 16, wherein said component configured to form a predicted descriptor of the current image portion from at least one other image portion and the selected prediction function comprises a unit for applying a prediction function with parameters that can be adapted and wherein said component configured to adapt, at least said prediction function of a temporal type on the basis of the analysis of said coding context, such that said output stream is free from information related to said adaptation adapts at least one parameter of the prediction function, some of the adapted parameters not being integrated into an output stream intended for the decoder.

18. The coder according to claim 16, further including a component configured to express an identifier of the selected prediction function in relation to the group of usable functions with parameters that have been adapted and a component configured to integrate that identifier into an output stream intended for the decoder.

19. An image decoder comprising:
   a component configured to receive a data stream containing a residue;
   a component configured to select a prediction function in a tunable group of usable prediction functions;
   a component configured to form a predicted descriptor of a current image portion from at least one other image portion and the selected prediction function; and
   a component configured to combine the predicted descriptor and the residue to deliver a current descriptor of the current image portion;
   wherein said group of tunable functions comprises at least one prediction function of a temporal type, and the decoder further comprises:
   a component configured to analyze the decoding context according to at least image features; and
   a component configured to adapt, at least said prediction function of a temporal type on the basis of the analysis of said coding context, such that said output stream is free from information related to said adaptation.

20. The decoder according to claim 11, wherein the component configured to form a predicted descriptor of a current image portion from at least one other image portion and the selected prediction function comprises a unit for applying at least one tunable prediction function and wherein said a component configured to adapt, at least said prediction function of a temporal type on the basis of the analysis of said coding context, such that said output stream is free from information related to said adaptation adapts at least one parameter of the prediction function.

* * * * *

UNITED STATES PATENT AND TRADEMARK OFFICE
CERTIFICATE OF CORRECTION

PATENT NO. : 8,611,413 B2
APPLICATION NO. : 12/087577
DATED : December 17, 2013
INVENTOR(S) : Joël Jung, Guillaume Laroche and Marc Ballavoine Page 1 of 1

It is certified that error appears in the above-identified patent and that said Letters Patent is hereby corrected as shown below:

In the Claims:

At column 9, line 28, please delete "said coding context" and insert therefore, --said decoding context--.

At column 9, lines 55-56, please delete "said coding context" and insert therefore, --said decoding context--.

At column 12, line 11, please delete "said coding context" and insert therefore, --said decoding context--.

Signed and Sealed this
First Day of April, 2014

Michelle K. Lee
*Deputy Director of the United States Patent and Trademark Office*